United States Patent
Nakamura et al.

(10) Patent No.: US 11,549,005 B2
(45) Date of Patent: Jan. 10, 2023

(54) INORGANIC SUBSTANCE POWDER-CONTAINING THERMOPLASTIC RESIN COMPOSITION AND FORMED ARTICLE

(71) Applicant: TBM CO., LTD., Tokyo (JP)

(72) Inventors: Hiroshi Nakamura, Tokyo (JP); Eiji Mizuno, Tokyo (JP); Taichi Yamaguchi, Tokyo (JP)

(73) Assignee: TBM CO., LTD., Tokyo (JP)

( * ) Notice: Subject to any disclaimer, the term of this patent is extended or adjusted under 35 U.S.C. 154(b) by 0 days.

(21) Appl. No.: 17/441,967

(22) PCT Filed: Feb. 21, 2020

(86) PCT No.: PCT/JP2020/007084
§ 371 (c)(1),
(2) Date: Sep. 22, 2021

(87) PCT Pub. No.: WO2020/195429
PCT Pub. Date: Oct. 1, 2020

(65) Prior Publication Data
US 2022/0089849 A1  Mar. 24, 2022

(30) Foreign Application Priority Data
Mar. 25, 2019  (JP) .............. JP2019-056441

(51) Int. Cl.
*C08L 23/06* (2006.01)
*C08L 23/12* (2006.01)
*C08K 3/26* (2006.01)

(52) U.S. Cl.
CPC .............. *C08L 23/12* (2013.01); *C08L 23/06* (2013.01); *C08K 2003/265* (2013.01); *C08K 2201/003* (2013.01)

(58) Field of Classification Search
CPC .......... C08L 23/04; C08L 23/06; C08L 23/08; C08L 23/10; C08L 23/12; C08L 23/14; C08K 2003/265; C08K 2201/003
See application file for complete search history.

(56) References Cited

U.S. PATENT DOCUMENTS 5,489,471 A * 2/1996 Inoue ............... C08K 3/26
428/307.3
2012/0196950 A1  8/2012 Weismann et al.
2013/0273271 A1  10/2013 Romano, Jr.
2014/0100328 A1  4/2014 Sumi et al.
2018/0201779 A1 * 7/2018 Oh ............... C08L 29/04

FOREIGN PATENT DOCUMENTS

| | | |
|---|---|---|
| CA | 2012699 A1 | 12/1990 |
| CN | 1106739 A | 8/1995 |
| CN | 103724914 A | 4/2014 |
| CN | 105219070 A | 1/2016 |
| JP | S62271708 A | 11/1987 |
| JP | H01261435 A | 10/1989 |
| JP | H02169795 A | 6/1990 |
| JP | H08199004 A | 8/1996 |
| JP | 2001139733 A | 5/2001 |
| JP | 2002080631 A | 3/2002 |
| JP | 2003142636 A | 5/2003 |
| JP | 2007284468 A | 11/2007 |
| JP | 2012062377 A | 3/2012 |
| JP | 2013010931 A | 1/2013 |
| JP | 2015514031 A | 5/2015 |
| JP | 2018171860 A | 11/2018 |
| WO | 2011085332 A1 | 7/2011 |
| WO | 2013155062 A1 | 10/2013 |
| WO | WO2017014361 A1 * | 1/2017 |

OTHER PUBLICATIONS

International Search Report for International Application No. PCT/JP2020/007084; dated Apr. 28, 2020.
JPO Notice of Reasons for Rejection for corresponding JP Application No. 2019-056441; dated Oct. 8, 2019.

* cited by examiner

*Primary Examiner* — Irina S Zemel
*Assistant Examiner* — Jeffrey S Lenihan
(74) *Attorney, Agent, or Firm* — Cantor Colburn LLP

(57) ABSTRACT

Provided is a thermoplastic resin composition that reduces uneven distribution of inorganic substance particles and is suitable for producing a formed article having excellent appearance and mechanical properties even when the thermoplastic resin is highly filled with inorganic substance powder and a formed article using this thermoplastic resin composition. Provided are an inorganic substance powder-containing thermoplastic resin composition including a thermoplastic resin and inorganic substance powder in a mass ratio of 50:50 to 10:90, in which the inorganic substance powder is calcium carbonate particles, the calcium carbonate particles include at least two groups of particles having different average particle diameters, and any of the average particle diameters of the particle groups is within a range of 0.7 μm or more and 6.0 μm or less; and a formed article using this inorganic substance powder-containing thermoplastic resin composition.

12 Claims, No Drawings

INORGANIC SUBSTANCE POWDER-CONTAINING THERMOPLASTIC RESIN COMPOSITION AND FORMED ARTICLE

CROSS REFERENCE TO RELATED APPLICATIONS

This is the U.S. national stage of application No. PCT/JP2020/007084, filed on Feb. 21, 2020. Priority under 35 U.S.C. § 119(a) and 35 U.S.C. § 365(b) is claimed from Japanese Application No. 2019-056441, filed on Mar. 25, 2019, the disclosure of which is also incorporated herein by reference.

FIELD

The present invention relates to an inorganic substance powder-blended thermoplastic resin composition and a formed article. More specifically, the present invention relates to a thermoplastic resin composition suitable for producing a formed article in which uneven distribution of inorganic substance particles is reduced and appearance and mechanical properties are excellent even when the thermoplastic resin is highly filled with inorganic substance powder and a formed article using this thermoplastic resin composition.

BACKGROUND

Conventionally, thermoplastic resins have been widely used as materials for various industrial and household formed articles, food packaging, formed packaging for general products, and the like together with paper materials derived from forest resources. However, environmental protection becomes an international issue now and thus reduction in the consumption amount of the thermoplastic resins and paper materials has been significantly studied in parallel with the viewpoint of allowing the thermoplastic resins and paper materials to be non-toxic, recyclable, and incinerated.

From such a viewpoint, an inorganic substance powder-blended thermoplastic resin composition formed by highly filling inorganic substance powder into a thermoplastic resin has been developed and put into practical use (refer to, for example, Patent Literature 1). In particular, calcium carbonate as the inorganic substance powder is a resource that is abundant in the nature and can preferably respond to requirement from the viewpoint of the environmental protection.

However, when calcium carbonate particles are filled in a thermoplastic resin and the resultant mixture is kneaded with a kneader such as a twin-screw extruder, voids (dead spaces) generated between adjacent calcium carbonate particles cause extreme difficulty in uniform dispersion of the calcium carbonate particles in the thermoplastic resin when, in particular, the calcium carbonate particles are highly filled in a ratio of 60% by mass or more. As a result, the calcium carbonate particles are unevenly distributed in the thermoplastic resin and have large unevenness of the surface state of the formed article and fluctuation of mechanical properties, which has caused a problem in practical use. It is conceivable that the particle diameter of the calcium carbonate particles to be blended is made smaller to reduce the size of the voids generated between the adjacent calcium carbonate particles. However, highly filled calcium carbonate particles having a smaller particle diameter causes the viscosity at the time of kneading the calcium carbonate particles into the thermoplastic resin to be significantly increased and thus the kneading becomes impossible.

Generally, in order to increase the filling rate of the additive in the matrix, it is conceivable that a plurality of types of fillers are used. For example, use of a combination of similar types or deferent types of fillers to various matrices has been developed in, for example, Patent Literatures 2 to 7.

However, none of the techniques disclosed in each of these Patent Literatures takes into consideration of the problem of uneven distribution in the case where the calcium carbonate particles, particularly heavy calcium carbonate particles, are highly filled as inorganic substance powder in the thermoplastic resin. Even when these techniques are applied based on the conditions disclosed in each Patent Literature, the desired improvement such as the uniformity of the surface state of the formed article and the improvement of the mechanical properties cannot be achieved.

CITATION LIST

Patent Literature

Patent Literature 1: Japanese Patent Application Laid-open No. 2013-10931
Patent Literature 2: Japanese Patent Application Laid-open No. S62-271708
Patent Literature 3: Japanese Patent Application Laid-open No. 2001-139733
Patent Literature 4: Japanese Patent Application Laid-open No. 2003-142636
Patent Literature 5: Japanese Patent Application Laid-open No. H1-261435
Patent Literature 6: Japanese Patent Application Laid-open No. H2-169795
Patent Literature 7: Japanese Patent Application Laid-open No. 2002-80631

SUMMARY

Technical Problem

The present invention has been made in view of the above actual situations. An object of the present invention is to provide an improved inorganic substance powder-blended thermoplastic resin composition and a formed article. Another object of the present invention is to provide a thermoplastic resin composition highly filled with inorganic substance powder that reduces uneven distribution of inorganic substance particles and is suitable for producing a formed article having excellent appearance and mechanical properties even when the inorganic substance powder is highly filled in the thermoplastic resin and a formed article using this thermoplastic resin composition.

Solution to Problem

As a result of intensive study for solving the above-described problems, the inventors of the present invention have found that uneven distribution of inorganic substance powder in a thermoplastic resin can be reduced and that a formed article having excellent appearance and mechanical properties can be obtained by using at least two groups of calcium carbonate particle groups having different particle diameter distributions, that is, different average particle diameters within the range of a predetermined average particle diameter in the case where calcium carbonate particles as the inorganic substance powder are highly filled into the thermoplastic resin. Consequently, the present invention has been attained.

Namely, the present invention solving the above-described problems includes an inorganic substance powder-containing thermoplastic resin composition comprising an thermoplastic resin and inorganic substance powder in a mass ratio of 50:50 to 10:90, in which the inorganic substance powder is calcium carbonate particles, the calcium carbonate particles comprise at least two groups of particles having different average particle diameters, and any of the average particle diameters of the particle groups is within a range of 0.7 μm or more and 6.0 μm or less.

As one aspect of the inorganic substance powder-containing thermoplastic resin composition according to the present invention, the inorganic substance powder-containing thermoplastic resin composition in which in the case where the at least two groups of particles having different average particle diameters are classified into a calcium carbonate particle group A having a smaller average particle diameter and a calcium carbonate particle group B having a larger average particle diameter, A:B is 1:1 to 5:1 in a mass ratio is represented.

As one aspect of the inorganic substance powder-containing thermoplastic resin composition according to the present invention, the inorganic substance powder-containing thermoplastic resin composition in which in the case where an average particle diameter of the calcium carbonate particle group A having a smaller average particle diameter is determined to be "a" and an average particle diameter of the calcium carbonate particle group B having a larger average particle diameter is determined to be "b", a ratio of a/b is 0.85 or less is represented.

As one aspect of the inorganic substance powder-containing thermoplastic resin composition according to the present invention, the inorganic substance powder-containing thermoplastic resin composition in which a calcium carbonate particle group having an average particle diameter of 0.7 μm or more and less than 2.2 μm and a calcium carbonate particle group having an average particle diameter of 2.2 μm or more and less than 6.0 μm are contained in a mass ratio of 1:1 to 5:1 as the at least two groups of particles having different average particle diameters is represented.

As one aspect of the inorganic substance powder-containing thermoplastic resin composition according to the present invention, the inorganic substance powder-containing thermoplastic resin composition in which a mass ratio of the thermoplastic resin and the inorganic substance powder in the inorganic substance powder-containing thermoplastic resin composition is 40:60 to 10:90 is represented.

As one aspect of the inorganic substance powder-containing thermoplastic resin composition according to the present invention, the inorganic substance powder-containing thermoplastic resin composition in which the thermoplastic resin is a polypropylene-based resin and/or a polyethylene-based resin is represented.

As one aspect of the inorganic substance powder-containing thermoplastic resin composition according to the present invention, the inorganic substance powder-containing thermoplastic resin composition in which the calcium carbonate is heavy calcium carbonate is represented.

As one aspect of the inorganic substance powder-containing thermoplastic resin composition according to the present invention, the inorganic substance powder-containing thermoplastic resin composition in which the calcium carbonate is heavy calcium carbonate not subjected to surface treatment is represented.

Furthermore, the present invention solving the above-described problems includes a formed article made of the above-described inorganic substance powder-containing thermoplastic resin composition.

Advantageous Effects of Invention

According to the present invention, uneven distribution of the calcium carbonate particles can be reduced and the formed article having excellent appearance and mechanical properties can be produced even when the calcium carbonate particles are highly filled in the thermoplastic resin as the inorganic substance powder in a mass ratio of 50:50 to 10:90.

DESCRIPTION OF EMBODIMENTS

Hereinafter, the present invention will be described in detail with reference to embodiments.

«Inorganic Substance Powder-Blended Thermoplastic Resin Composition»

The inorganic substance powder-blended thermoplastic resin composition according to the present invention includes the thermoplastic resin and the inorganic substance powder in a mass ratio of 50:50 to 10:90. As the inorganic substance powder to be blended, the calcium carbonate particles having a predetermined particle diameter distribution as described below in detail are used. Hereinafter, each component constituting the thermoplastic resin composition according to the present invention will be described in detail.

«Thermoplastic Resin»

The thermoplastic resin that can be used in the inorganic substance powder-blended thermoplastic resin composition according to the present invention is not particularly limited. Various types can be used depending on the use, function, and the like of the composition. Example of the thermoplastic resin include polyolefin-based resins such as polyethylene-based resins, polypropylene-based resins, polymethyl-1-pentene, and ethylene-cyclic olefin copolymers; functional group-containing polyolefin-based resins such as ethylene-vinyl acetate copolymers, ethylene-acrylic acid copolymers, ethylene-methacrylic acid copolymers, metal salts of ethylene-methacrylic acid copolymers (ionomers), ethylene-acrylic acid alkyl ester copolymers, ethylene-methacrylic acid alkyl ester copolymers, maleic acid-modified polyethylene, and maleic acid-modified polypropylene; polyamide-based resins such as nylon-6, nylon-6,6, nylon-6,10, and nylon-6,12; thermoplastic polyester-based resins including aromatic polyester resins such as polyethylene terephthalate and its copolymer, polyethylene naphthalate, and polybutylene terephthalate and aliphatic polyester-based resins such as polybutylene succinate and polylactic acid; polycarbonate-based resins including aromatic polycarbonates and aliphatic polycarbonates; polystyrene-based resins such as atactic polystyrene, syndiotactic polystyrene, acrylonitrile-styrene (AS) copolymers, and acrylonitrile-butadiene-styrene (ABS) copolymers; polyvinyl chloride-based resins such as polyvinyl chloride and polyvinylidene chloride; polyphenylene sulfides; and polyether-based resins such as polyethersulfone, polyetherketone, and polyetheretherketone. These thermoplastic resins can be used singly or in combination of two or more of them.

Of these thermoplastic resin, the polyolefin-based resins, the aromatic polyester-based resins, and the aliphatic polyester-based resins are preferably used from the viewpoints of easy formability, performance aspects, economy aspects, and the like.

Here, the polyolefin-based resins refer to polyolefin-based resins containing an olefin component unit as a main component. Specific examples of the polyolefin-based resins include the polypropylene-based resin and the polyethylene-based resin as described above, and in addition polymethyl-1-pentene and ethylene-cyclic olefin copolymers, as well as a mixture of two or more of these resins. The above phrase "as a main component" means that the olefin component unit is contained in the polyolefin-based resin in an amount of 50% by mass or more. The content of the olefin component unit is preferably 75% by mass or more, more preferably 85% by mass, and further preferably 90% by mass or more. The method for producing the polyolefin-based resin used in the present invention is not particularly limited. The polyolefin-based resin may be obtained by any of methods using a Ziegler-Natta catalyst, a metallocene catalyst, oxygen, a radical initiator such as a peroxide, and the like.

Examples of the polypropylene-based resin include resins including a propylene component unit of 50% by mass or more. Examples of the resin include propylene homopolymers or copolymers of propylene and other α-olefins copolymerizable with propylene. Examples of the other α-olefins that can be copolymerized with propylene include α-olefins having a carbon number of 4 to 10 such as ethylene, 1-butene, isobutylene, 1-pentene, 3-methyl-1-butene, 1-hexene, 3,4-dimethyl-1-butene, 1-heptene, and 3-methyl-1-hexene. As the propylene homopolymers, any of isotactic polypropylene, syndiotactic polypropylene, atactic polypropylene, hemiisotactic polypropylene, and linear or branched polypropylene exhibiting various stereoregularities are included. The above copolymer may be a random copolymer or a block copolymer and may be not only a binary copolymer but also a ternary copolymer. Specifically, examples thereof can include an ethylene-propylene random copolymer, a butene-1-propylene random copolymer, an ethylene-butene-1-propylene random ternary copolymer, and an ethylene-propylene block copolymer. The other olefin copolymerizable with propylene in the above copolymer is preferably contained in a ratio of 25% by mass or less and particularly 15% by mass or less in the case where the total mass of the inorganic substance powder-blended thermoplastic resin composition is determined to be 100% by mass. The lower limit is preferably 0.3% by mass. These polypropylene-based resins can be used singly or in combination of two or more of them.

Examples of the polyethylene-based resin include resins having an ethylene component unit of 50% by mass or more. Examples of the polyethylene-based resin include high-density polyethylene (HDPE), low-density polyethylene (LDPE), medium-density polyethylene, linear low-density polyethylene (LLDPE), an ethylene-vinyl acetate copolymer, an ethylene-propylene copolymer, an ethylene-propylene-butene-1 copolymer, an ethylene-butene-1 copolymer, an ethylene-hexene-1 copolymer, an ethylene-4-methylpentene-1 copolymer, an ethylene-octene-1 copolymer, and a mixture of two or more of these resins.

Of the above-described polyolefin-based resins, the polypropylene-based resins and/or the polyethylene-based resins, in particular the polypropylene-based resins are preferably used because the polypropylene-based resins have a particularly excellent balance between mechanical strength and heat resistance.

«Inorganic Substance Powder»

As the inorganic substance powder that can be blended in the inorganic substance powder-blended thermoplastic resin composition according to the present invention, calcium carbonate particles are used. The properties of the calcium carbonate particles as a material itself will be described in detail later.

In the present invention, at least two groups of calcium carbonate particles having different average particle diameter distributions are used as the calcium carbonate particles as the inorganic substance powder to be blended in the inorganic substance powder-blended thermoplastic resin composition. The combination is not limited to the two groups and may be a combination of three or more groups as long as the average particle diameter distributions are different to each other.

Although not particularly limited, it is desirable that the calcium carbonate particle groups having different average particle diameters be separately produced and thereafter kneaded into the resin material. In addition, at least two groups of calcium carbonate particles having different average particle diameters may be mixed at the powder stage or may be added separately to the resin and mixed after kneading. The calcium carbonate particle groups are preferably mixed at the powder stage from the viewpoint of uniform dispersion.

The average particle diameter of the calcium carbonate particles to be added affects the appearance and mechanical strength of the formed article formed from the inorganic substance powder-blended thermoplastic resin composition to which the calcium carbonate particles are added or physical properties such as viscosity at the time of kneading the thermoplastic resin composition. As the average particle diameter of the calcium carbonate particles becomes smaller, the appearance of the formed article tends to become better. However, the viscosity at the time of kneading tends to become higher as the average particle diameter becomes smaller. Although depending on the application, the high viscosity at the time of kneading the thermoplastic resin composition causes the forming itself to be difficult or the original physical properties of the resin to be difficult to exhibit. In particular, this tendency becomes significant in the case where the calcium carbonate particles are blended in a high content. On the other hand, as the average particle diameter of the calcium carbonate particles becomes larger, kneading into the thermoplastic resin composition becomes easier and the cost of the particles per unit mass becomes lower, which has economic advantage. However, uneven distribution of the particles in the resin composition is likely to occur and an increase in the blend amount becomes difficult. In addition, in the case where the formed article is formed from the inorganic substance powder-blended thermoplastic resin composition, there is a risk that the appearance of the formed article may deteriorate. Therefore, in the present invention, both of the properties of the calcium carbonate particles having a smaller outer diameter and the properties of the calcium carbonate particles having a larger outer diameter are exhibited by blending the particle groups having different average particle diameters of calcium carbonate particles in the thermoplastic resin composition and kneading the resultant mixture.

For example, mixing calcium carbonate particle group A having a certain average particle diameter with calcium carbonate particle group B having an average particle diameter larger than that of the calcium carbonate particle group A allows the space between the calcium carbonate particles of the calcium carbonate particle group B and the resin to be filled with the calcium carbonate particles of the calcium carbonate particle group A in a complex state where the calcium carbonate particle group B alone is coarsely dispersed in the thermoplastic resin. This allows the uneven distribution of the calcium carbonate particles to be reduced and the amount of the calcium carbonate particles to be added to be effectively increased. In addition, the distribution of the calcium carbonate particles in the resin composition is densified and complication of the three-dimensional arrangement relation between the particles is achieved by dispersing the calcium carbonate particles of the calcium carbonate particle group A in the gap where the calcium carbonate particles of the calcium carbonate particle group B are dispersed. Consequently, mechanical strength is also increased.

As the calcium carbonate particles used in the present invention, at least two groups of calcium carbonate particles having different average particle diameter distributions as described above are used. The average particle diameter of each of the particle groups is desirably within a range of 0.7 µm to 6.0 µm. This is because even when at least multiple groups of calcium carbonate particles having different average particle diameter distributions are used, blend of extremely fine or extremely coarse particle groups causes difficulty in desired reduction in the uneven distribution of the inorganic substance powder and improvement in the appearance of the formed article.

Although not particularly limited, in the case where the average particle diameter of the calcium carbonate particle group A having a smaller average particle diameter is determined to be "a" and the average particle diameter of the calcium carbonate particle group B having a larger average particle diameter is determined to be "b", it is desired that the calcium carbonate particle groups can be roughly classified so as to be a ratio of a/b of not greater than 0.85, more preferably about 0.10 to about 0.70, and further preferably about 0.10 to about 0.50. This is because a particularly excellent effect can be expected by using the calcium carbonate particle groups having obvious difference in average particle diameter to some extent in combination.

Each of the calcium carbonate particle groups used in the present invention desirably has a coefficient of variation (Cv) of the distribution of the particle diameter (µm) of the calcium carbonate particle group of about 0.01 to about 0.10 and particularly desirably about 0.03 to about 0.08. It is conceivable that this is because, in the case of the inorganic substance powder-blended thermoplastic resin composition using the calcium carbonate particle groups having a coefficient of variation (Cv) of the particle diameter of about 0.01 to 0.10, each of the particle groups more complementarily provides effects when each of the particle in the calcium carbonate particle group having a smaller average particle diameter and the calcium carbonate particle group having a larger average particle diameter brings actions such as reduction in the uneven distribution of the particles and improvement in the appearance and mechanical strength of the formed article as described above in the inorganic substance powder-blended thermoplastic resin composition using the calcium carbonate particles in the particle diameter variation defined by the variation coefficient (Cv).

As at least two groups of calcium carbonate particles having different average particle diameter distribution used in the present invention, the combination of the calcium carbonate particle groups is not particularly limited as long as the calcium carbonate particle groups have the average particle diameters within the range as described above. The combination of the calcium carbonate particle group A having a smaller particle diameter having an average particle diameter thereof of 0.7 µm to less than 2.2 µm and more preferably 1.0 µm or more and less than 1.9 µm and the calcium carbonate particle group B having a larger particle diameter having an average particle diameter thereof of 2.2 µm to 6.0 µm and more preferably 2.5 µm or more and 5.0 µm or less is particularly desirable. A mixture formed by substantially uniformly mixing both of the groups is preferable. Mixing both of the calcium carbonate particle groups allows the uneven distribution of the calcium carbonate particles to be reduced and the formed article having excellent appearance and mechanical properties such as elongation at break to be obtained due to excellent and highly filling properties as compared with single use of the calcium carbonate particle group A having a smaller average particle diameter alone or single use of the calcium carbonate particle group B having a larger average particle diameter alone. In addition, falling-off of the calcium carbonate particles can be reduced from the composite material of the formed article made by forming the resin composition.

The average particle diameter of the inorganic substance powder described in the present specification, that is, the calcium carbonate particles refers to a value calculated from the measurement result of the specific surface area by the air permeation method in accordance with JIS M-8511. As a measurement device, for example, a specific surface area measurement apparatus Type SS-100 manufactured by SHIMADZU CORPORATION can be preferably used.

In the embodiment in which a calcium carbonate particle group having an average particle diameter thereof of 0.7 µm or more and less than 2.2 µm as the calcium carbonate particle group A having a smaller particle diameter and a calcium carbonate particle group having an average particle diameter thereof of 2.2 µm or more and 6.0 µm or less as the calcium carbonate particle group B having a larger particle diameter are used in combination, the boundary value of the average particle diameters of the calcium carbonate particle group A having a smaller particle diameter and the calcium carbonate particle group B having a larger particle diameter is determined to be 2.2 µm. This is because the determination is based on the acquisition of the conclusion in which the uneven distribution of the added calcium carbonate can be most significantly reduced and the formed article having excellent appearance and mechanical properties can be formed by combining the particle group having larger particles than the particles having this boundary value and the particle group having smaller particles than the particles having this boundary value as a result of intensive studies and many experiments conducted by the inventors of the present invention.

The reason why the average particle diameter of the calcium carbonate particle group A having a smaller average particle diameter is determined to be 0.7 µm or more is that in the case where the average particle diameter is excessively small, the viscosity at the time of kneading with the above thermoplastic resin may significantly increase even when the calcium carbonate particle group B having a larger average particle diameter is combined, which may cause difficulty in production of the formed article.

On the other hand, the reason why the average particle diameter of the calcium carbonate particle group B having a larger average particle diameter is determined to be 6.0 µm or less is that in the case where the average particle diameter becomes excessively large, the uneven distribution of the particles may occur at the time of kneading with the above thermoplastic resin and the appearance of the obtained formed article may deteriorate even when the calcium carbonate particle group A having a smaller average particle diameter is combined.

In the present invention, in the embodiment in which three or more groups are used as the calcium carbonate particle groups having different average particle diameter distributions, it is desired that one of the calcium carbonate particle groups having relatively smaller average particle diameter have an average particle diameter thereof of less than 2.2 μm and one of the calcium carbonate particle groups having relatively larger average particle diameter have an average particle diameter thereof of 2.2 μm or more.

As described above, in the present invention, at least two groups of calcium carbonate particles having different average particle diameter distributions are used and the particles having a particle diameter of more than 50 μm are preferably substantially excluded as the entire calcium carbonate particles to be used, in particular, in the particle diameter distribution thereof. On the other hand, excessively fine particles cause the viscosity at the time of kneading with the above thermoplastic resin to be significantly increased and thus the production of the formed article may be difficult. Therefore, particles having a particle diameter of less than 0.5 μm are also preferably substantially excluded. Here, the phrase "substantially excluded" means an aspect in which the particles having such a particle diameter are included in an amount of, for example, merely less than 0.1% by mass and more preferably merely less than 0.01% by mass relative to the mass of the total particles.

Furthermore, in the inorganic substance powder-blended thermoplastic resin composition according to the present invention, the blend ratio of at least two groups of calcium carbonate particles having different average particle diameter distributions is not particularly limited as long as the effects such as reduction in the uneven distribution of the calcium carbonate particles, improvement in the appearance of the obtained formed article, improvement in the mechanical strength, reduction in the viscosity at the time of kneading the composition, and reduction in falling-off of the calcium carbonate particles from the formed article are obtained as compared with the case where a single calcium carbonate particle group is used. For example, in the case where the calcium carbonate particle groups are divided into the calcium carbonate particle group A having a smaller average particle diameter and the calcium carbonate particle group B having a larger average particle diameter as described above, it is desired that A:B be about 1:1 to about 5:1 and more preferably about 3:1 to about 5:1 in a mass ratio. This is because a particularly excellent effect can be expected by employing such a blend ratio.

Here, the calcium carbonate particles used in the present invention may be both of what is called light calcium carbonate particles prepared by a synthesis method and what is called heavy calcium carbonate particles obtained by mechanically grinding and classifying natural raw materials including $CaCO_3$ as the main component, such as limestone, and they can be also combined. From the viewpoint of economic efficiency, the heavy calcium carbonate particles are preferable.

The heavy calcium carbonate is a product obtained by mechanically grinding and processing natural limestone or the like and is clearly distinguished from synthetic calcium carbonate produced by chemical precipitate reaction or the like.

The heavy calcium carbonate particles is different from, for example, light calcium carbonate produced by the synthesis method and is characterized by irregular shape properties of the surface and high specific surface area due to particle formation performed by grinding treatment. Due to the irregular shape properties of the surface and high specific surface area of the heavy calcium carbonate particles as described above, the heavy calcium carbonate particles have more contact interfaces with the thermoplastic resin in the case where the heavy calcium carbonate particles are blended in the thermoplastic resin.

Although not particularly limited, the specific surface area of the heavy calcium carbonate particles, which is dependent on the average particle diameter of the heavy calcium carbonate, is desirably about 3,000 $cm^2/g$ or more and about 35,000 $cm^2/g$ or less. In the case of the heavy calcium carbonate particles having an average particle diameter of 0.7 μm or more and less than 2.2 μm, the specific surface area is desirably about 10,000 $cm^2/g$ or more and less than about 35,000 $cm^2/g$, whereas in the case of the heavy calcium carbonate particles having an average particle diameter of 2.2 μm or more and less than 6.0 μm, the specific surface area is desirably about 3,000 $cm^2/g$ or more and about 35,000 $cm^2/g$ or less. Here, the specific surface area is determined in accordance with an air permeation method. With respect to the obtained formed article, the heavy calcium carbonate particles having the specific surface area within this range allows deterioration in processability of the resin composition due to the blend of the heavy calcium carbonate particles to be reduced.

The irregular shape properties of the heavy calcium carbonate particles can be represented by the low degree of spheroidization of the particle shape. Although not particularly limited, specifically, the roundness is 0.50 or more and 0.95 or less, more preferably 0.55 or more and 0.93 or less, and further preferably 0.60 or more and 0.90 or less. The heavy calcium carbonate particles having the roundness within this range allow the strength as the product and forming processability to be appropriate in the case where the heavy calcium carbonate particles are blended into the thermoplastic resin composition to form the formed article.

Here, the roundness can be represented by (Projected area of particle)/(Area of a circle having the same perimeter as the projected perimeter of particle). The method for measuring the roundness is not particularly limited. For example, the projected area of the particle and the projected perimeter of the particle are measured from a micrograph and determined to be (A) and (PM), respectively. When the radius of a circle having the same perimeter as the projected perimeter of the particle is determined to be (r), $$PM = 2\pi r \tag{1}$$

When the area of the circle having the same perimeter as the projected perimeter of the particle is determined to be (B), $$B = \pi r^2 \tag{2}$$

Transforming Formula (1) results in $$r = PM/2\pi \tag{3}$$

Therefore, substituting Formula (3) into Formula (2) results in $$B = \pi \times (PM/2\pi)^2 \tag{4}$$

Therefore, the roundness is determined as Roundness=$A/B = A \times 4\pi/(PM)^2$.

The particles to be measured are sampled so as to represent the particle diameter distribution of the powder. As the number of the measured particles becomes larger, the measured value becomes more reliable. In consideration of the measurement time also, the roundness is said to be determined by the average value of about 100 particles. In the present specification, the average value of 100 particles are also used. These measurements are performed with generally commercially available image analysis software using the projection image of each particle obtained by a scanning microscope, a stereomicroscope, or the like, whereby the roundness can be determined.

In order to enhance the dispersibility of the calcium carbonate particles in the thermoplastic resin, the surface of the calcium carbonate particles may be modified in accordance with the common methods in advance. Examples of the surface modification method can include a method of physical treatment such as plasma treatment and a method of chemical treatment of the surface with a coupling agent or a surfactant. Examples of the coupling agent include a silane coupling agent and a titanium coupling agent. As the surfactant, any of an anionic surfactant, a cationic surfactant, a nonionic surfactant, and an amphoteric surfactant may be used. Examples of the surfactant include a higher fatty acid, a higher fatty acid ester, a higher fatty acid amide, and a higher fatty acid salt.

However, in the preferable embodiment of the present invention, as the calcium carbonate particles to be used, calcium carbonate particles that are not subjected to the surface treatment of the inorganic substance powder using the chemical treatment agent, or at least not subjected to the surface treatment with the fatty acid-based compound as described above are preferably used. This is because use of the calcium carbonate particles not subjected to the surface treatment as described above allows the cause of slight odor due to the thermal decomposition of the surface treatment agent attached to the calcium carbonate surface at the time of forming to be eliminated. Therefore, as a particularly preferable embodiment of the present invention, use of the heavy calcium carbonate not subjected to the surface treatment as the inorganic substance powder to be used is included.

The grinding method for obtaining the heavy calcium carbonate particles includes a dry method and a wet method. From the viewpoint of economic efficiency, the dry method is preferable. The crusher is not particularly limited and an impact crusher, a crusher using a crushing medium such as a ball mill, a roller mill, or the like may be used. In addition, the classification may be performed using an air classification, a wet cyclone, a decanter, or the like.

With respect to the inorganic substance powder-blended thermoplastic resin composition according to the present invention, the color tone, the mechanical properties, and the like of the resin composition can be modified by adding other inorganic substance powders in addition to at least two groups of calcium carbonate particles as described above, if necessary, as long as the action and effect due to use of at least two groups of calcium carbonate particles having different average particle diameters are not substantially impaired.

The other inorganic substance powder other than calcium carbonate is not particularly limited. Example of the other inorganic substance powder include magnesium carbonate, zinc oxide, titanium oxide, silica, alumina, clay, talc, kaolin, aluminum hydroxide, and magnesium hydroxide.

The blend ratio of the above-described thermoplastic resin and inorganic substance powders (% by mass) included in the inorganic substance powder-blended thermoplastic resin composition according to the present invention is not particularly limited as long as the blend ratio is 50:50 to 10:90. The ratio is preferably in a ratio of 40:60 to 10:90 and further preferably in a ratio of 35:65 to 20:80. The amount of the inorganic substance powder referred to here is the whole amount of the total amount of at least two groups of calcium carbonate particles as described above and the amount of other inorganic substance powder that is added, if necessary.

This is because, with respect to the blend ratio of the thermoplastic resin and the inorganic substance powders, given texture and physical properties such as impact resistance of the inorganic substance powder-blended thermoplastic resin composition provided by blending the inorganic substance powders are not obtained in the case where the ratio of the inorganic substance powders is less than 50% by mass, whereas forming process by, for example, extrusion forming or vacuum forming is difficult in the case where the ratio of the inorganic substance powders is more than 90% by mass.

«Other Additives»

To the inorganic substance powder-blended thermoplastic resin composition according to the present invention, other additives can be blended as auxiliary agents, if necessary. As the other additives, for example, colorants, lubricating agents, coupling agents, flowability improvers, dispersing agents, antioxidants, ultraviolet ray absorbers, flame retardants, stabilizers, antistatic agents, foaming agents, and the like may be blended. These additives may be used singly or in combination of two or more of them. These additives may be blended at the kneading process described below or may be previously blended to the inorganic substance powder-blended thermoplastic resin composition before the kneading process. In the inorganic substance powder-blended thermoplastic resin composition according to the present invention, the amount of these other additives to be added is not particularly limited as long as the given effect by the blend of the above thermoplastic resin and at least two groups of calcium carbonate particles having different average particle diameters is not impaired. For example, each of these other additives is desirably blended in a ratio of about 0% by mass to about 5% by mass and the ratio of the entire other additives is desirably 10% by mass or less in the case where the mass of the entire thermoplastic resin composition is determined to be 100%.

Hereinafter, the additives considered to be important in these additives will be described with reference to examples. However, the additives are not limited to these additives.

As the colorants, any of the known organic pigments, inorganic pigments, or dyes may be used. Specific examples include organic pigments such as azo-based, anthraquinone-based, phthalocyanine-based, quinacridone-based, isoindolinone-based, dioxazine-based, perinone-based, quinophthalone-based, and perylene-based pigments and inorganic pigments such as ultramarine blue, titanium oxide, titanium yellow, iron oxide (red iron oxide), chromium oxide, zinc white, and carbon black.

Examples of the lubricating agents include fatty acid-based lubricating agents such as stearic acid, hydroxystearic acid, complex stearic acid, and oleic acid; aliphatic alcohol-based lubricating agents; aliphatic amide-based lubricating agents such as stearoamide, oxystearamide, oleylamide, erucylamide, ricinolamide, behenamide, methylolamide, methylenebisstearamide, methylenebisstearobehenamide, higher fatty acid bisamides, and complex amides; aliphatic ester-based lubricating agents such as n-butyl stearate, methyl hydroxystearate, polyhydric alcohol fatty acid esters, saturated fatty acid esters, and ester-based wax; and fatty acid metal soap-based lubricants.

As the antioxidants, phosphorous-based antioxidants, phenol-based antioxidants, and pentaerythritol-based antioxidants may be used. The phosphorous-based antioxidants, more specifically, phosphorous-based antioxidant stabilizer such as phosphite esters and phosphate esters are preferably used. Examples of the phosphites include triesters, diesters, and monoesters of phosphorous acid such as triphenyl phosphite, trisnonylphenyl phosphite, and tris(2,4-di-t-butylphenyl)phosphite.

Examples of the phosphate esters include trimethyl phosphate, triethyl phosphate, tributyl phosphate, trioctyl phosphate, triphenyl phosphate, tricresyl phosphate, tris(nonylphenyl) phosphate, and 2-ethylphenyl diphenyl phosphate. These phosphorous-based antioxidants may be used singly or in combination of two or more of them.

Examples of the phenol-based antioxidants include α-tocopherol, butylhydroxytoluene, sinapyl alcohol, vitamin E, n-octadecyl-3-(3,5-di-t-butyl-4-hydroxyphenyl) propionate, 2-t-butyl-6-(3'-t-butyl-5'-methyl-2'-hydroxybenzyl)-4-methylphenyl acrylate, 2,6-di-t-butyl-4-(N,N-dimethylaminomethyl)phenol, 3,5-di-t-butyl-4-hydroxybenzylphosphonate diethyl ester, and tetrakis[3-(3,5-di-t-butyl-4-hydroxyphenyl)propionyloxymethyl]methane. These phenol-based antioxidants may be used singly or in combination of two or more of them.

The flame retardant is not particularly limited. For example, a halogen-based flame retardant or a non-halogen-based flame retardant such as a phosphorus-based flame retardant and a metal hydrate may be used. Specific examples of the halogen-based flame retardant include a halogenated bisphenol-based compound such as a halogenated bisphenylalkane, a halogenated bisphenyl ether, a halogenated bisphenyl thioether, and a halogenated bisphenyl sulfone and a bisphenol-bis(alkylether)-based compound such as brominated bisphenol A, brominated bisphenol S, chlorinated bisphenol A, and chlorinated bisphenol S. Specific examples of the phosphorus-based flame retardant include aluminum tris(diethylphosphinate), bisphenol-A-bis-(diphenylphosphate), tri(isopropylated aryl) phosphates, cresyl-di-2,6-xylenyl phosphate, and an aromatic condensed phosphate. Specific examples of the metal hydrate include aluminum trihydrate, magnesium dihydroxide, and combination thereof. These flame retardants may be used singly or in combination of two or more of them. In addition, for example, antimony oxide such as antimony trioxide and antimony pentoxide, zinc oxide, iron oxide, aluminum oxide, molybdenum oxide, titanium oxide, calcium oxide, magnesium oxide, or the like can be used together as a flame retardant auxiliary. These compounds act as flame retardant auxiliaries and can more efficiently improve the flame retardant effect.

The foaming agent is mixed or injected with pressure in the inorganic substance powder-blended thermoplastic resin composition serving as the raw material in a melted state in a melting kneader and is a substance that causes phase change from solid to gas or from liquid to gas or a substance that is gas itself. The foaming agent is mainly used for controlling the foaming ratio (foam density) of the foam sheet. As the foaming agent dissolved in the inorganic substance powder-blended thermoplastic resin composition serving as the raw material, the phase of a foaming agent that is liquid at normal temperature is changed into gas to dissolve in the melted resin and the phase of a foaming agent that is gas at normal temperature is not changed and the foaming agent is dissolved in the melted resin as it is. The foaming agent dispersed and dissolved in the melted resin expands inside a sheet at the time of extruding the melted resin from an extrusion die in a sheet-like form because the pressure is released and thus many fine closed cells are formed in the sheet to provide a foam sheet. The foaming agent acts as a plasticizer as a side effect that reduces the melt viscosity of the raw material resin composition and lowers the temperature for making the raw material resin composition in a plasticized state.

Examples of the foaming agent include aliphatic hydrocarbons such as propane, butane, pentane, hexane, and heptane; alicyclic hydrocarbons such as cyclobutane, cyclopentane, and cyclohexane; halogenated hydrocarbons such as chlorodifluoromethane, difluoromethane, trifluoromethane, trichlorofluoromethane, dichloromethane, dichlorofluoromethane, dichlorodifluoromethane, chloromethane, chloroethane, dichlorotrifluoroethane, dichloropentafluoroethane, tetrafluoroethane, difluoroethane, pentafluoroethane, trifluoroethane, dichlorotetrafluoroethane, trichlorotrifluoroethane, tetrachlorodifluoroethane, and perfluorocyclobutane; inorganic gas such as carbon dioxide, nitrogen, and air; and water.

As the foaming agent, for example, a compound in which the active component of the foaming agent is contained in a carrier resin is also preferably used. Examples of the carrier resin include a crystalline olefin resin. Of these carrier resins, crystalline polypropylene resin is preferable. Examples of the active component include hydrogen carbonate salts. Of these compounds, the hydrogen carbonate salts are preferable. The compound is preferably a foaming agent concentrate including the crystalline polypropylene resin as the carrier resin and the hydrogen carbonate salt as the thermally decomposable foaming agent.

The content of the foaming agent included in the foaming agent in the forming process can be appropriately determined depending on, for example, the quantity of the thermoplastic resin and the heavy calcium carbonate particles. The content is preferably determined to be in the range of 0.04% by mass to 5.00% by mass relative to the total mass of the inorganic substance powder-blended thermoplastic resin composition.

<Method for Producing Inorganic Substance Powder-Blended Thermoplastic Resin Composition>

In the method for producing the inorganic substance powder-blended thermoplastic resin composition according to the present invention, common methods can be used. The method may be appropriately determined depending on the forming method (for example, extrusion forming, injunction forming, and a vacuum forming). For example, the thermoplastic resin and the at least two groups of calcium carbonate particles having different average particle diameters as the inorganic substance powders may be kneaded and melted before the materials are fed from a hopper to a forming machine or the thermoplastic resin and the inorganic substance powders may be integrally and simultaneously kneaded and melted with forming using a forming machine. The melting and kneading are preferably carried out by applying high shear stress to the kneading while the inorganic substance powder is being uniformly dispersed in the thermoplastic resin and preferably carried out using a twin-screw kneader to knead.

In the method for producing the inorganic substance powder-blended thermoplastic resin composition according to the present invention, the inorganic substance powder-blended thermoplastic resin composition may be in the form of pellets or may be different from the form of pellets. In the case where the thermoplastic resin composition is in the form of pellets, the shape of the pellets is not particularly limited. For example, pellets having a cylindrical shape, a spherical shape, an elliptical sphere shape, or the like may be formed.

The size of the pellets may be appropriately determined depending on the form. For example, in the case of the spherical pellets, the diameter may be 1 mm to 10 mm. In the case of the elliptical sphere shape pellets, the pellets may be an elliptical sphere shape having a ratio of a longitudinal length and a transverse length of 0.1 to 1.0 and a longitudinal and transverse size of 1 mm to 10 mm. In the case of cylindrical pellets, the pellets may have a diameter in the range of 1 mm to 10 mm and a length in the range of 1 mm to 10 mm. These shapes may be formed to the pellets after the kneading process described below. The shape of the pellets may be formed in accordance with the common methods.

<Formed Article>

The formed article according to the present invention is a formed article formed by using the inorganic substance powder-blended thermoplastic resin composition.

The shape and the like of the formed article according to the present invention are not particularly limited. The shape may be various forms and the formed article may be formed as various formed articles such as a sheet, a container for food, and other container body.

The thickness of the formed article according to the present invention is not particularly limited and may be various thickness from a thin thickness to a thick thickness depending on the form of the formed article. For example, the formed article preferably having a thickness of 40 μm to 5,000 μm and more preferably having a thickness of 50 μm to 1,000 μm is exhibited. The formed article having the thickness within the range allows the formed article having no problems of formability and processability, not causing uneven thickness, being uniform, and having no defect to be formed.

In particular, in the case where the form of the formed article is a sheet, the thickness of the sheet is desirably more preferably 50 μm to 1,000 μm and further preferably 50 μm to 400 μm. The sheet having the thickness within such a range can be suitably used instead of paper or synthetic paper for the application of general printing and information and packaging.

<Method for Producing Formed Article>

The method for producing the formed article according to the present invention is not particularly limited as long as the formed article can be formed in a desired shape. The formed article can be formed and processed in any conventionally known methods such as extrusion forming, injection forming, vacuum forming, blow forming, and calendar forming. Furthermore, in the case where the thermoplastic resin composition according to the present invention includes the foaming agent and the formed article of an aspect serving as the foaming body is obtained, for example, both liquid phase forming methods such as injection forming, extrusion foaming, and blow foaming or solid phase foaming methods such as bead foaming, batch foaming, press foaming, and secondary foaming under normal pressure may be used. As described above, in one aspect of the thermoplastic composition in which the crystalline polypropylene as the carrier resin and the hydrogen carbonate salt as the thermally decomposable foaming agent are included, the injection foaming method and the extrusion foaming method can be desirably used.

The forming temperature at forming cannot be simply determined because the temperature varies to a certain extent depending on the forming method, the type of the thermoplastic resin to be used, and the like. For example, the forming article formed at a temperature of 180° C. to 260° C. and more preferably 190° C. to 230° C. allows the thermoplastic resin composition according to the present invention to have the excellent drawdown property and extension property and the formed article having the predetermined shape to be formed without locally generating degeneration of the composition.

<Method for Producing Sheet>

In the aspect in which the formed article according to the present invention is a sheet, the method for producing the sheet is not particularly limited as long as the method is a method for forming the thermoplastic resin composition to a sheet-like product and the conventionally known forming method as described above can be used. In particular, considering the smoothness of the sheet surface, the method for producing the sheet by extrusion forming using an extruder is preferably employed.

As the forming, a direct method in which a kneading process and a forming process to the sheet-like product are continuously carried out may be used or a method for using a twin screw extrusion forming machine with a T die system may be used.

In the case of forming the sheet-like product, the sheet-like product can be stretched in a uniaxial direction, biaxial directions, or multi-axial directions (For example, stretching by a tubular method) at the forming or after the forming of the sheet-like product. In the case of the biaxial stretching, the stretching may be sequential biaxial stretching or simultaneously biaxial stretching.

Stretching the sheet after forming (for example, longitudinal stretching and/or transverse stretching) results in decreasing the density of the sheet. The decrease in the density allows the whiteness of the sheet to be excellent.

EXAMPLES

Hereinafter, the present invention will be specifically described with reference to Examples. Examples are described only for the purpose of exemplifying the specific aspects and embodiments in order to more facilitate the understanding of the concept and scope of the present invention disclosed in the present specification and described in the attached CLAIMS and the present invention is not limited Examples in any manner.

(Evaluation Methods)

Each physical property in Examples and Comparative Examples described below was evaluated in accordance with the following methods.

(Average Particle Diameter of Inorganic Substance Powder)

The average particle diameter was calculated from the measurement result of a specific surface area by an air permeation method in accordance with JIS M-8511 using a specific surface area measurement apparatus Type SS-100 manufactured by SHIMADZU CORPORATION.

(Specific Surface Area of Inorganic Substance Powder)

The specific surface area was determined by a nitrogen gas adsorption method using BELSORP-mini manufactured by MicrotracBEL Co., Ltd.

(Roundness of Particle)

So as to represent the particle distribution of powder, 100 particles were sampled. The particle image of the projection image of each of these particles obtained using an optical micrometer was subjected to image analysis using a commercially available image analysis software to determine the roundness. As a measurement principle, the projected area of the particle and the projected perimeter of the particle are measured and determined to be (A) and (PM), respectively. When the radius of a circle having the same perimeter as the projected perimeter of the particle is determined to be (r), $$PM = 2\pi r \qquad (1).$$

When the area of the circle having the same perimeter as the projected perimeter of the particle is determined to be (B), $$B = \pi r^2 \quad (2).$$

Transforming Formula (1) results in $$r = PM/2\pi \quad (3).$$

Therefore, substituting Formula (3) into Formula (2) results in $$B = \pi \times (PM/2\pi)^2 \quad (4).$$

Therefore, the roundness is determined as Roundness=A/B=A×4π/(PM)².

(Tensile Strength and Elongation)

The tensile strength and elongation were measured using Autograph AG-100kNXplus (manufactured by SHIMADZU CORPORATION) under conditions of 23° C. and 50% RH in accordance with JIS K 7161-2:2014. The test specimen was formed by cutting out the formed article described below and had a dumbbell shape. The stretching speed was 10 mm/minute.

(Product Appearance)

The smoothness of the appearance of the formed article surface was visually examined and evaluated in accordance with the following evaluation criteria.

[Evaluation Criteria]

○: No irregularities, scratches, and the like are observed at all and the surface has excellent smoothness. Δ: Slightly shallow irregularities are observed on the surface.

× : Many irregularities are observed on the surface.

(Materials)

The components used in Examples and Comparative Examples described below were as follows.

Thermoplastic Resins (A)

A1: Polypropylene homopolymer (manufactured by Prime Polymer Co., Ltd.: Prime Polypro (trade name) E111G, melting point 160° C.)

A2: Polypropylene block copolymer (manufactured by Prime Polymer Co., Ltd.: Prime Polypro (trade name) BJS-MU, melting point 160° C.)

A3: High-density polyethylene homopolymer (manufactured by KEIYO POLYETHYLENE CO., LTD.: B5803, melting point 133° C.)

Inorganic Substance Powders (B)

B1: Heavy calcium carbonate particles (without surface treatment), average particle diameter 0.70 μm, specific surface area 32,000 cm²/g (Softon 3200, manufactured by Bihoku Funka Kogyo Co., Ltd.)

B2: Heavy calcium carbonate particles (without surface treatment), average particle diameter 0.85 μm, specific surface area 26,000 cm²/g (Softon 2600, manufactured by Bihoku Funka Kogyo Co., Ltd.)

B3: Heavy calcium carbonate particles (without surface treatment), average particle diameter 1.00 μm, specific surface area 22,000 cm²/g (Softon 2200, manufactured by Bihoku Funka Kogyo Co., Ltd.)

B4: Heavy calcium carbonate particles (without surface treatment), average particle diameter 1.50 μm, specific surface area 15,000 cm²/g (Softon 1500, manufactured by Bihoku Funka Kogyo Co., Ltd.)

B5: Heavy calcium carbonate particles (without surface treatment), average particle diameter 3.60 μm, specific surface area 6,000 cm²/g (BF100, manufactured by Bihoku Funka Kogyo Co., Ltd.)

B6: Heavy calcium carbonate particles (without surface treatment), average particle diameter 5.00 μm, specific surface area 4,000 cm²/g (BF200, manufactured by Bihoku Funka Kogyo Co., Ltd.)

B7: Light calcium carbonate particles, average particle diameter 1.5 μm (PC, manufactured by Shiraishi Kogyo Kaisha, Ltd.)

Ba: Heavy calcium carbonate particles (without surface treatment), average particle diameter 8.00 μm, specific surface area 2,700 cm²/g (BF300, manufactured by Bihoku Funka Kogyo Co., Ltd.)

Antistatic Agent (D)

D: Lauric acid diethanolamide

Lubricating Agent (E)

E: Sodium alkane sulfonate (carbon number of alkyl group (average value)=12)

Antioxidants (F)

F1: Hindered phenolic antioxidant (pentaerythritol tetrakis[3-(3',5'-di-t-butyl-4'-hydroxyphenyl) propionate]

F2: Tris(2,4-di-t-butylphenyl)phosphite

Example 1

The polypropylene homopolymer A1 as the thermoplastic resin (A) and the above B2 and B6 as the inorganic substance powder (B) were used in the blend ratio as listed in Table 1. As the antistatic agent, the lubricating agent, and the antioxidants, the above D, E, F1, and F2 were used in appropriate amounts and the total amount thereof was determined to be 6.0 parts by mass. The blend amounts of the antistatic agent, the lubricating agent, and the antioxidants were the same in other Examples and Comparative Examples described below except Example 5. In Table 1, the numerical values of each component are the values of parts by mass. Each component was charged into an extrusion forming machine equipped with twin-screw screws (T-die extrusion forming apparatus manufactured by Toyo Seiki Seisaku-sho, Ltd., (screw diameter 20 mm and L/D=25) and kneaded at 200° C. The kneaded raw material was extruded from the T-die to form a sheet at 220° C. (die temperature) and the extruded sheet was wound up by a film/sheet winder manufactured by Toyo Seiki Seisaku-sho, Ltd. The thickness of thus obtained sheet was 200 μm.

With respect to the obtained sheets, the properties of tensile strength, elongation, and surface appearance were evaluated by the above procedure. The obtained results are listed in Table 2.

Examples 2 to 10 and Comparative Examples 1 to 6

Sheets having a wall thickness of 200 μm were prepared in the same manner as the manner in Example 1 except that the type and amount of each component in the thermoplastic resin composition were changed as listed in Table 1 below and the properties thereof were evaluated. The obtained results are listed in Table 2.

TABLE 1

|  | Thermoplastic resin (A) | Total amount of inorganic substance powers (B) | Mass ratio of each inorganic substance powers (B) | Total amount of D, E, F1, and F2 |
|---|---|---|---|---|
| Comparative Example 1 | A1/40 | 60 | B1 alone | 6.0 |
| Comparative Example 2 | A1/40 | 60 | B6 alone | 6.0 |
| Reference Example 1 | A1/40 | 60 | B2:B6 = 1:2 | 6.0 |

TABLE 1-continued

| | Thermoplastic resin (A) | Total amount of inorganic substance powers (B) | Mass ratio of each inorganic substance powers (B) | Total amount of D, E, F1, and F2 |
|---|---|---|---|---|
| Example 1 | A1/40 | 60 | B2:B6 = 1:1 | 6.0 |
| Example 2 | A1/40 | 60 | B2:B6 = 2:1 | 6.0 |
| Example 3 | A1/40 | 60 | B2:B6 = 4:1 | 6.0 |
| Example 4 | A1/40 | 60 | B2:B6 = 5:1 | 6.0 |
| Example 5 | A1/40 | 60 | B2:B6 = 1:1 | — |
| Reference Example 2 | A1/40 | 60 | B2:B6 = 6:1 | 6.0 |
| Example 6 | A1/40 | 60 | B1:B6 = 2:1 | 6.0 |
| Example 7 | A1/40 | 60 | B3:B6 = 2:1 | 6.0 |
| Example 8 | A1/40 | 60 | B4:B6 = 2:1 | 6.0 |
| Example 9 | A1/40 | 60 | B7:B6 = 2:1 | 6.0 |
| Example 10 | A1/40 | 60 | B2:B5 = 2:1 | 6.0 |
| Comparative Example 3 | A1/40 | 60 | B2:Ba = 2:1 | 6.0 |
| Example 11 | A2/40 | 60 | B2:B6 = 2:1 | 6.0 |
| Example 12 | A3/40 | 60 | B2:B6 = 2:1 | 6.0 |
| Example 13 | A1/50 | 50 | B2:B6 = 2:1 | 6.0 |
| Example 14 | A1/30 | 70 | B2:B6 = 2:1 | 6.0 |
| Example 15 | A1/20 | 80 | B2:B6 = 2:1 | 6.0 |
| Example 16 | A1/10 | 90 | B2:B6 = 2:1 | 6.0 |
| Example 17 | A1/40 | 60 | B1:B2:B6 = 1:1:1 | 6.0 |
| Example 18 | A1/40 | 60 | B1:B4:B6 = 2:1:1 | 6.0 |
| Example 19 | A1/40 | 60 | B1:B4:B5:B6 = 3:2:2:1 | 6.0 |

TABLE 2

| | Tensile strength (MPa) | Elongation (%) | Product appearance | Remarks |
|---|---|---|---|---|
| Comparative Example 1 | — | — | — | Impossible to carry out extrusion forming due to excessively high viscosity at kneading |
| Comparative Example 2 | 15 | 140 | x | — |
| Reference Example 1 | 25 | 260 | Δ | — |
| Example 1 | 30 | 280 | ○ | — |
| Example 2 | 30 | 290 | ○ | — |
| Example 3 | 30 | 300 | ○ | — |
| Example 4 | 30 | 320 | ○ | — |
| Example 5 | 30 | 280 | ○ | — |
| Reference Example 2 | 28 | 290 | Δ | — |
| Example 6 | 30 | 290 | ○ | — |
| Example 7 | 28 | 270 | ○ | — |
| Example 8 | 27 | 265 | ○ | — |
| Example 9 | 26 | 260 | ○ | — |
| Example 10 | 29 | 290 | ○ | — |
| Comparative Example 3 | 13 | 120 | x | — |
| Example 11 | 26 | 310 | ○ | — |
| Example 12 | 24 | 335 | ○ | — |
| Example 13 | 28 | 300 | ○ | — |
| Example 14 | 30 | 275 | ○ | — |
| Example 15 | 32 | 260 | ○ | — |
| Example 16 | 34 | 240 | ○ | — |
| Example 17 | 29 | 295 | ○ | — |
| Example 18 | 30 | 285 | ○ | — |
| Example 19 | 29 | 280 | ○ | — |

As can be seen from the results listed in Table 2, in Examples according to the present invention, the inorganic substance powder was uniformly added into the resin component without uneven distribution and extrusion forming was able to be stably carried out without causing any problems even in the high blend amount of the inorganic substance powder. Consequently, the formed article having excellent appearance of the obtained formed article and also having the excellent mechanical properties was able to be obtained.

Example 20

The inorganic substance powder-blended thermoplastic resin composition having the same composition as the resin composition in Example 1 was formed into a sheet at a temperature of 220° C. using a twin-screw extruder with a T-die and thereafter the obtained sheet was vacuum-formed into a container product having a deep-dish shape at a temperature of 220° C. As a result, as similar to the case of Example 1, the container product having sufficient mechanical properties and excellent appearance was able to be produced without causing any troubles at the time of the processing.

The invention claimed is:

1. An inorganic substance powder-containing thermoplastic resin composition comprising:
   a thermoplastic resin and inorganic substance powder in a mass ratio of 50:50 to 30:70, wherein
   a mass ratio of the thermoplastic resin relative to a total mass of the inorganic substance powder-containing thermoplastic resin composition is 30/106 to 50/100,
   the thermoplastic resin is a polypropylene-based resin and/or a polyethylene-based resin,
   the inorganic substance powder is heavy calcium carbonate particles,
   the heavy calcium carbonate particles comprise at least two groups of particles having different average particle diameters, and
   a heavy calcium carbonate particle group having an average particle diameter of 0.7 μm or more and less than 2.2 μm and a heavy calcium carbonate particle group having an average particle diameter of 2.2 μm or more and less than 6.0 μm are contained in a mass ratio of 1:1 to 5:1 as the at least two groups of particles having different average particle diameters.

2. The inorganic substance powder-containing thermoplastic resin composition according to claim 1, wherein in the case where an average particle diameter of a heavy calcium carbonate particle group A having a smaller average particle diameter is determined to be "a" and an average particle diameter of a heavy calcium carbonate particle group B having a larger average particle diameter is determined to be "b", a ratio of a/b is 0.85 or less.

3. A formed article made of the inorganic substance powder-containing thermoplastic resin composition as claimed in claim 2.

4. The inorganic substance powder-containing thermoplastic resin composition according to claim 1, wherein a mass ratio of the thermoplastic resin and the inorganic substance powder in the inorganic substance powder-containing thermoplastic resin composition is 40:60 to 30:70.

5. The inorganic substance powder-containing thermoplastic resin composition according to claim 4, wherein in the case where an average particle diameter of a heavy calcium carbonate particle group A having a smaller average particle diameter is determined to be "a" and an average particle diameter of a heavy calcium carbonate particle group B having a larger average particle diameter is determined to be "b", a ratio of a/b is 0.85 or less.

6. A formed article made of the inorganic substance powder-containing thermoplastic resin composition as claimed in claim 5.

7. A formed article made of the inorganic substance powder-containing thermoplastic resin composition as claimed in claim 4.

8. The inorganic substance powder-containing thermoplastic resin composition according to claim 1, wherein the heavy calcium carbonate is heavy calcium carbonate not subjected to surface treatment.

9. A formed article made of the inorganic substance powder-containing thermoplastic resin composition as claimed in claim 8.

10. A formed article made of the inorganic substance powder-containing thermoplastic resin composition as claimed in claim 1.

11. The inorganic substance powder-containing thermoplastic resin composition according to claim 1, wherein a specific surface area of the heavy calcium carbonate particles is 10,000 $cm^2/g$ or more and less than 35,000 $cm^2/g$ in the heavy calcium carbonate particle group having an average particle diameter of 0.7 μm or more and less than 2.2 μm.

12. The inorganic substance powder-containing thermoplastic resin composition according to claim 1, wherein a specific surface area of the heavy calcium carbonate particles is 10,000 $cm^2/g$ or more and less than or equal to 32,000 $cm^2/g$ in the heavy calcium carbonate particle group having an average particle diameter of 0.7 μm or more and less than 2.2 μm.

* * * * *